Patented Nov. 19, 1929

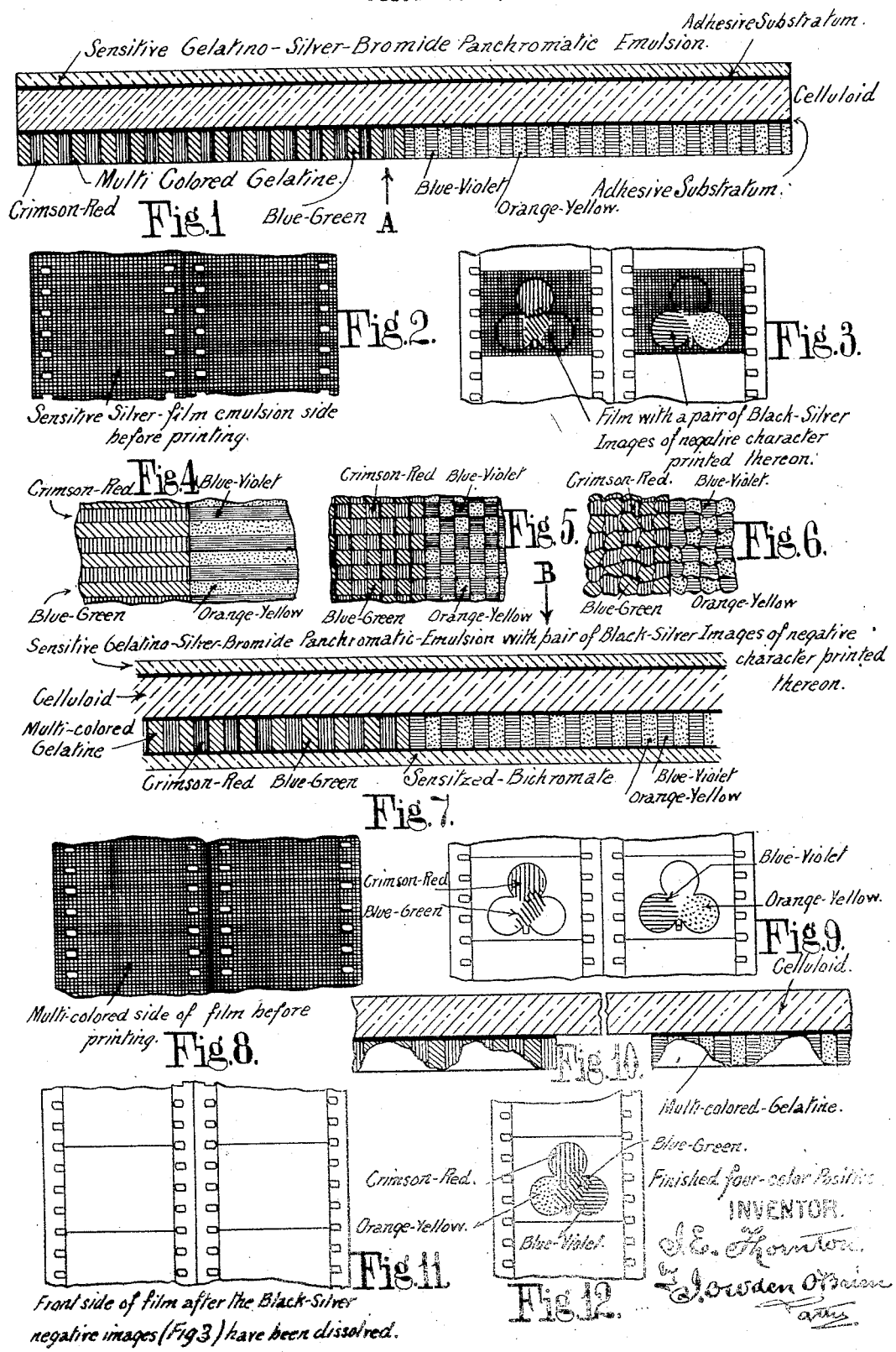

1,736,555

UNITED STATES PATENT OFFICE

JOHN EDWARD THORNTON, OF WEST HAMPSTEAD, LONDON, ENGLAND

MULTICOLOR CINEMATOGRAPH FILM

Application filed December 7, 1925, Serial No. 73,947, and in Great Britain December 19, 1927.

This invention relates to an improved process for the production of multicolor positive transparencies.

According to the invention a mosaic multicolor positive is produced by combining two half-pictures each formed in two-color-mosaic, with the two colors of one different from the two colors of the other half-picture; the component images and colors of the complete picture being produced by means of a special form of sensitized material comprising three layers, viz:—a double picture-area of transparent support, a double area layer of panchromatic gelatino-silver-bromid emulsion, and a double area layer of mosaic-colored sensitized colloid divided into two single areas each having two colors in mosaic pattern, but the two colors of one half being different from the two colors of the other half.

The invention will be described with reference to the accompanying drawings:—

Fig. 1 is a transverse section greatly enlarged in depth through a double width negative film material the photo being taken through the color screen and celluloid base as shown by the arrow A.

Fig. 2 is a plan of double width film sensitized with silver bromid emulsion.

Fig. 3 is a plan of double width negative film showing a pair of images formed one on each half, the images having been photographed through their respective color screens.

Figs. 4, 5 and 6 are plan views greatly enlarged of portions of the colored gelatine adjacent to the centre line of the double width strip.

Fig. 7 is a transverse section greatly enlarged through a double width material after the silver bromid images have been produced and at the instant the four colored gelatine is being coated with sensitized bichromate, when the bichromate has penetrated and sensitized the color screen this latter will be ready for receiving a positive printed in the direction of the arrow B.

Fig. 8 is a plan of double-width film shown in Fig. 7 showing the surface coated with sensitized bichromate.

Fig. 9 is a plan of double-width positive film showing a pair of colored images formed one on each half width.

Fig. 10 is a transverse section of part of Fig. 9 greatly enlarged showing the images in relief.

Fig. 11 is a plan of the reverse side of the film material to that shown in Fig. 9 after the black silver images shown in Fig. 3 have been dissolved therefrom.

Fig. 12 is a plan of the finished positive film after the two halves have been superimposed to form a single width film the images shown in Fig. 10 being arranged face to face between the two celluloid supports.

The sensitized material shown in Fig. 1 is fully described in my pending specification Serial No. 73,948 filed December 7, 1925. It comprises three layers, a panchromatic gelatino-silver-bromid layer coated upon one side of a transparent waterproof support of double standard width and half standard thickness and a layer of multicolored gelatine or other suitable colloid coated upon the other side of the transparent support. The multi-colored colloid layer is divided into two parts or color groups, one color group occupying one half width of the double width support and the other color group the other half width.

The colored colloid layers or color screens are made up of an immense number of exceedingly fine colored areas in the form of dots, lines or mosaic pattern as shown in Figs. 4, 5 and 6 each color group containing two colors. The dots, lines or other form of fine colored areas in two colors for each half width are intermixed preferably in equal proportions upon the support.

The colors used for a four-color set are preferably crimson-red and blue-green for one half the film, and blue-violet and orange-yellow for the other half. These form one complete color-group. Each half of the double-width film therefore contains its own complementary color. This particular arrangement however is not necessarily a hard and fast rule, though it is preferred, for if desired the complementary colors of each pair may be arranged upon the adjoining half instead of upon the same half-width.

A color positive is now produced upon the sensitive gelatine silver bromid layer Fig. 2 of the above described film material by printing in the direction of the arrow A, Fig. 1 by exposure under a pair of suitably colored positives then developed, fixed, washed and dried, thus producing a pair of black metallic silver images of negative character Fig. 3 which forms a pair of printing clichés. The component images on one half width giving that portion of the picture requiring the two colors of the screen applied thereto and the component image on the other half width giving that portion of the picture in the other two colors.

The colored gelatine image layer or color screen is now immersed in a bichromate bath the bichromate salt penetrating into and sensitizing the color screen. Fig. 7 shows the screen layer in the act of acquiring the sensitized bichromate salt. The screen layer is thus rendered more or less insoluble according to its exposure to light.

After sensitizing the screen layer a pair of positive images are formed therein by exposing it to light pasing through the pair of black silver negative images in the direction of arrow B Fig. 7 rendering the colloid Fig. 8 more or less insoluble according to the lights and shades of the negatives.

The exposed colored gelatine layer is now developed in hot water to dissolve and remove all the colored gelatine not renderd insoluble by the action of the light and the black silver negative images are removed either by chemically dissolving out the silver and leaving the transparent gelatine behind on the support, or by dissolving the gelatine itself by hot water at the same time as the colored gelatine, thus removing the black-silver negative-images simultaneously, leaving the plain film shown in Fig. 11.

The positive images obtained in the screen layer consist of two reliefs each comprising two colors, one upon each half-width of the double-width support, making four colors in all, but contained within only two picture areas. (Figs. 9 and 10). Shortly described, this pair of positive-images may be termed a multi-color "carbon" print, consisting entirely of transparent dyed gelatine; such a print represents the highest standard of quality and transparency known in photographic practice.

The developing and other treatment being now completed there results a film support having attached to one side two half-pictures (Fig. 9) each containing two colors. The colored positives are brilliant, highly transparent, and free from any black-silver or other light-obstructing deposits.

The two half-picture prints are next combined (Fig. 12) either by cementing the parts together face-to-face, back-to-back or back-to-face, according to requirements and to disposition of the two-half-picture images.

What I claim as my invention and desire to protect by Letters Patent is:—

1. A process for photographically producing transparent positive pictures in mosaic-multi-color, which comprises combining two half-pictures each formed in two-color-mosaic, with the two colors of one different from the two colors of the other half-picture; the component images and colors of the complete picture being produced by means of a special form of sensitized material comprising three layers, viz:—a double picture-area of transparent support, a double area layer of panchromatic gelatino-silver-bromide emulsion, and a double area layer of mosaic-colored sensitized colloid divided into two single areas each having two colors in mosaic pattern, but the two colors of one half being different from the two colors of the other half.

2. A process for photographically producing transparent positive pictures in mosaic-multi-color, combining two half-pictures each of different two-color-mosaic upon a sensitive material of double picture area provided with a sensitized layer of panchromatic gelatino-silver-bromide emulsion and a sensitized layer of mosaic-colored-colloid divided into two single areas which consists in:—(a) producing from a pair of suitable color-selective originals or printing-clichés a pair of temporary images of negative character in the form of half-pictures upon the panchromatic gelatino-silver-bromide layer, by exposing and printing on to such layer by light which passes first through the aforesaid printing-clichés, then developing and finishing the two negative-images upon the layer; (b) producing from the pair of temporary negative-images a pair of permanent mosaic-colored images of positive character in the form of half-pictures upon the multi-color-mosaic sensitized colloid layer by exposing and printing on to such layer by light which passes first through the aforesaid temporary negative-images, then developing the exposed and printed images of colored colloid with hot water, thus producing two positives in relief, each having a different pair of colors and each representing only half a picture; (c) removing the temporary images of negative character; and finally (d) combining the two mosaic-colored half-pictures.

3. A process for photographically producing transparent positive-pictures in mosaic-multi-color, combining two half-pictures each of different two-color-mosaic upon a sensitive material of double picture area provided with a sensitized layer of panchromatic gelatino-silver-bromide emulsion and a sensitized layer of mosaic-colored-colloid divided into two single areas which consists in:—(a) producing from a pair of suitable color-selective originals or printing-clichés a pair of temporary images of negative character in the form of half-pictures upon the panchromatic gelotino-silver-bromide layer, by exposing and printing on to such layer by light which passes first through the aforesaid printing-clichés, then developing and finishing the two negative-images upon the layer; (b) producing from the pair of temporary negative-images a pair of permanent mosaic-colored images of positive character in the form of half-pictures upon the multi-color-mosaic sensitized colloid layer, by exposing and printing on to such layer by light which passes first through the aforesaid temporary negative-images, then developing the exposed and printed images of colored colloid with hot water, thus producing two positives in relief, each having a different pair of colors and each representing only half a picture; (c) removing the temporary images of negative character; and finally (d) combining the two mosaic-colored half-pictures by superimposing and cementing them together in accurate register; thus producing a complete multi-color picture-positive in colors corresponding to the colors in each component.

In testimony whereof I have hereunto set my hand.

JOHN EDWARD THORNTON.